(12) United States Patent
Wan et al.

(10) Patent No.: US 11,927,847 B2
(45) Date of Patent: Mar. 12, 2024

(54) DISPLAY PANEL AND DISPLAY DEVICE

(71) Applicants: CHONGQING HKC OPTOELECTRONICS TECHNOLOGY CO., LTD., Chongqing (CN); HKC CORPORATION LIMITED, Shenzhen (CN)

(72) Inventors: Ye Wan, Chongqing (CN); Rongrong Li, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/086,183

(22) Filed: Dec. 21, 2022

(65) Prior Publication Data

US 2023/0213809 A1  Jul. 6, 2023

(30) Foreign Application Priority Data

Dec. 31, 2021 (CN) .......................... 202111674865.2

(51) Int. Cl.
*G02F 1/1335* (2006.01)

(52) U.S. Cl.
CPC .. *G02F 1/133528* (2013.01); *G02F 1/133512* (2013.01); *G02F 1/133553* (2013.01)

(58) Field of Classification Search
CPC ......... G02F 1/133528; G02F 1/133512; G02F 1/133553
USPC .......................................................... 349/96
See application file for complete search history.

(56) References Cited

U.S. PATENT DOCUMENTS

2018/0196313 A1* 7/2018 Kang ................ G02F 1/133514

FOREIGN PATENT DOCUMENTS

KR         20110073725 A  *  6/2011

* cited by examiner

*Primary Examiner* — Alexander P Gross
*Assistant Examiner* — William D Peterson
(74) *Attorney, Agent, or Firm* — HAUPTMAN HAM, LLP

(57) ABSTRACT

A display panel and a display device are provided. The display panel includes a light-filtering layer, a color film substrate, a driving substrate, and a reflecting layer. The reflecting layer, the driving substrate, the light-filtering layer, and the color film substrate are stacked in sequence. The light-filtering layer includes a black matrix with multiple second openings, and each of the multiple second openings is filled with one light-filtering sub-pixel. The reflecting layer defines multiple first openings, and each of the multiple first openings is aligned with one second opening.

18 Claims, 6 Drawing Sheets

US 11,927,847 B2

DISPLAY PANEL AND DISPLAY DEVICE

CROSS-REFERENCE TO RELATED APPLICATIONS

This application claims priority under 35 U.S.C. § 119(a) to Chinese Patent Application No. 202111674865.2, filed Dec. 31, 2021, the entire disclosure of which is incorporated herein by reference.

TECHNICAL FIELD

This disclosure relates to the technical field of display, and in particular to a display panel and a display device.

BACKGROUND

In an existing display device, multiple light-filtering sub-pixels are usually disposed at a side surface of a color filter (CF) glass substrate facing a backlight module, and lights from the backlight module are converted into target-color lights by the light-filtering sub-pixels and emitted outwards, such that a preset-color display screen is displayed. However, in a process of the light-filtering sub-pixels colorizing incident lights, an interchannel cross-color problem may occur between adjacent light-filtering sub-pixels. Therefore, in order to avoid the interchannel cross-color problem of the adjacent light-filtering sub-pixels, a black matrix is further disposed at blank spaces among the light-filtering sub-pixels correspondingly, that is, the light-filtering sub-pixels are separated from each other by the black matrix.

However, when lights emitted by the backlight module are emitted to the CF glass substrate, part of the lights will be absorbed by the light-filtering sub-pixels, and part of the lights will be absorbed by the black matrix. The lights of the backlight module cannot be fully absorbed and utilized by the light-filtering sub-pixels, such that improvement of brightness of a display screen is limited, which may lead to poor display effect and poor user perception.

SUMMARY

A display panel is provided in the present disclosure. The display panel includes a light-filtering layer, a color film substrate, a driving substrate, and a reflecting layer. The reflecting layer, the driving substrate, the light-filtering layer, and the color film substrate are stacked in sequence, and the reflecting layer is located at a side close to a light source. The light-filtering layer includes a black matrix with multiple second openings, each of the multiple second openings is filled with one light-filtering sub-pixel, the reflecting layer defines multiple first openings, and each of the multiple first openings is aligned with the each of the multiple second openings.

A display device is further provided in the present disclosure. The display device includes a backlight module and a display panel. The display panel includes a light-filtering layer, a color film substrate, a driving substrate, and a reflecting layer. The reflecting layer, the driving substrate, the light-filtering layer, and the color film substrate are stacked in sequence, and the reflecting layer is located at a side close to a light source. The light-filtering layer includes a black matrix with multiple second openings, each of the multiple second openings is filled with one light-filtering sub-pixel, the reflecting layer defines multiple first openings, and each of the multiple first openings is aligned with the each of the multiple second openings. The backlight module serves as the light source of the display panel and is configured to provide lights for the display panel.

BRIEF DESCRIPTION OF THE DRAWINGS

The accompanying drawings herein, which are incorporated into the specification and constitute a part of the specification, illustrate implementations consistent with the present disclosure and serve to explain the principles of the present disclosure together with the specification. In order to explain technical solutions in implementations of the present disclosure more clearly, the following will give a brief introduction to the accompanying drawings which are needed to be used in the description of implementations. Apparently, for those of ordinary skill in the art, other accompanying drawings can be obtained according to these accompanying drawings without creative efforts.

Figure 1:
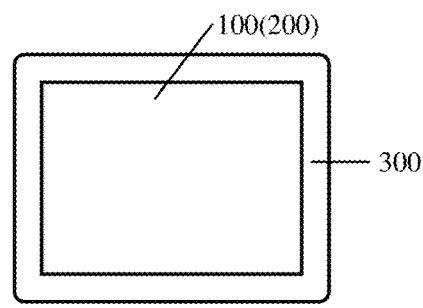
FIG. 1 is a schematic diagram of an operating scenario of a display device in the present disclosure.

The implementation, functional features, and advantages of the purpose of the present disclosure will be further described herein with reference to the accompanying drawings combined with implementations. Specific implementations of the present disclosure have been described in the above accompanying drawings, for which more detailed descriptions will be made later. These accompanying drawings and text descriptions are not intended to limit the scope of the present disclosure in any way, but to explain concepts of the present disclosure to those skilled in the art with reference to the particular implementations.

DETAILED DESCRIPTION

Exemplary implementations are described in detail herein, and examples of the exemplary implementations are presented in the accompanying drawings. When the following description relates to the accompanying drawings, unless otherwise stated, the same numbers in different accompanying drawings represent the same or similar element. Implementations described in the following exemplary implementations do not represent all implementations consistent with the present disclosure. On the contrary, they are merely examples of devices and methods that are described in the appended claims in detail and that are consistent with some aspects of the present disclosure.

It should be noted that in this specification, the terms "include", "comprise", "contain", or any other variants thereof are intended to cover non-exclusive inclusion, such that a process, method, article, or device including a series of elements not only includes those elements, but also includes other elements that are not explicitly listed, or elements inherent to the process, method, article, or device. If there are no more restrictions, the element defined by the sentence "include a . . . " does not exclude the existence of other same elements in the process, method, article, or device that includes the element. In addition, components, features, and elements with the same name in different implementations of the present disclosure may have the same meaning or may have different meanings, the specific meaning thereof needs to be determined by the explanation in the specific implementation or further combined with the context in the specific implementation.

It should be understood that although the terms first, second, third, or the like, may be used herein to describe various information, the information should not be limited to these terms. These terms are only used to distinguish the same type of information from each other. For example, without departing from the scope of the present disclosure, a first information can also be referred to as a second information, and similarly, the second information can also be referred to as the first information. Depending on the context, the word "if" as used herein can be interpreted as "when", "while" or "in response to a determination". In addition, as used herein, the singular forms "a", "an", and "the" are intended to also include the plural, unless the context dictates to the contrary. It should be further understood that the terms "comprising" and "including" indicate the presence of the described features, steps, operations, elements, components, items, types, and/or groups, but do not exclude the existence, appearance, or addition of one or more other features, steps, operations, elements, components, items, types, and/or groups. The terms "or", "and/or", "including at least one of the following", etc., used herein are to be interpreted as inclusive or mean any one or any combination. For example, "including at least one of the following: A, B, or C" means "any of the following: A; B; C; A and B; A and C; B and C; A, B, and C". For another example, "A, B, or C" or "A, B, and/or C" means "any one of the following: A; B; C; A and B; A and C; B and C; A, B, and C". An exception to this definition will only occur when the combination of elements, functions, steps, or operations is inherently mutually exclusive in some way.

The exemplary implementations are described herein with reference to a cross-sectional diagram and/or a plane diagram as idealized exemplary accompanying drawings. In the accompanying drawings, the thicknesses of layers and regions are enlarged for clarity. Therefore, variations in shape relative to the accompanying drawings due to, for example, manufacturing techniques and/or tolerances can be conceivable. Therefore, the exemplary implementations should not be interpreted as being limited to the shapes of the regions shown herein, but include deviations in shape due to, for example, manufacturing. Therefore, the regions shown in the accompanying drawings are schematic in essence, and their shapes are not intended to show the actual shape of the region of the device, and are not intended to limit the scope of the exemplary implementations.

In this specification, the expression "an orthographic projection of A on C covers an orthographic projection of B on C" is used, which means that the orthographic projection of B on C falls in a range of the orthographic projection of A on C.

Reference can be made to FIG. 1, which is a schematic diagram of an operating scenario of a display device 200 in the present disclosure. The display device 200 is fixedly disposed in a terminal 300 and includes a backlight module 210 (reference can be made to FIG. 2) and a display panel 100 in the present disclosure. The display panel 100 in the present disclosure includes a display surface, and the display surface is exposed beyond the terminal 300 and configured to display a picture. The backlight module 210 is stacked with the display panel 100, located at a side opposite to the display surface of the display panel 100, and configured to provide lights for the display panel 100 in the present disclosure. In other words, the backlight module 210 is a light source of the display panel 100 in the present disclosure. The terminal 300 may further include a controller (which is not illustrated in FIG. 1), and the controller is electrically coupled with the display panel 100 and configured to control image display of the display panel 100.

The terminal 300 may be an electronic device including a personal digital assistant (PDA) and/or a music player function, such as a mobile phone, a tablet computer, a wearable electronic device (e.g., a smart watch) with a wireless communication function, and the like. The above electronic device may also be other electronic devices, such as a laptop with a touch-sensitive surface (e.g., a touch panel), etc. In some implementations, the electronic device may have a communication function, that is, the electronic device may establish communication with a network through 2nd generation mobile communication technical specifications (2G), 3rd generation mobile communication technical specifications (3G), 4th generation mobile communication technical specifications (4G), 5th generation mobile communication technical specifications (5G), a wireless local area network (W-LAN), or a possible communication manner in the future.

Figure 2:
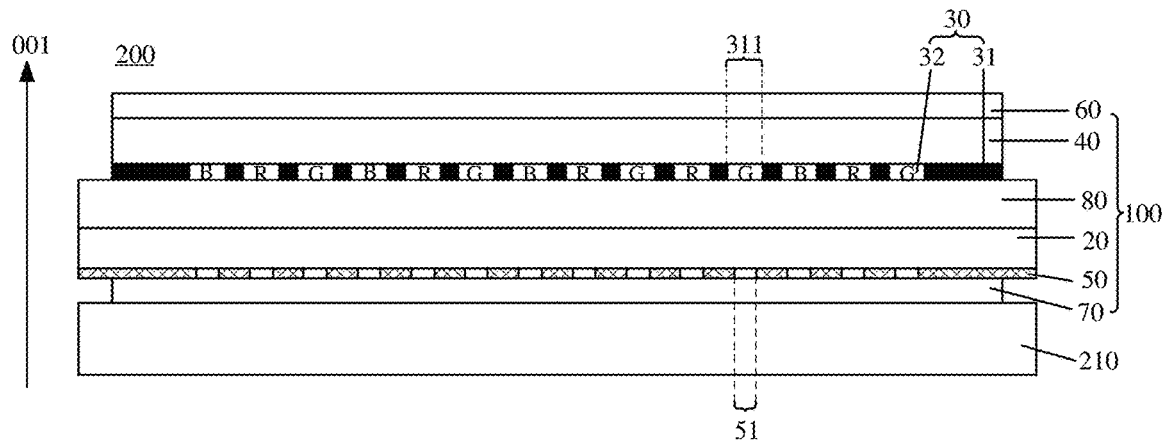
FIG. 2 is a schematic cross-sectional structural diagram of a display device in some implementations of the present disclosure.

In some implementations, reference can be made to FIG. 2, which is a schematic cross-sectional structural diagram of a display device 200 in some implementations of the present disclosure. As illustrated in FIG. 2, a display panel 100 is stacked on the backlight module 210 in stacked direction 001 from the driving substrate 20 to the light-filtering layer 30. The backlight module 210 provides lights for the display panel 100, such that the lights can be uniformly emitted, and a situation that brightness at a middle region of the display panel 100 is too high and brightness at a perimeter region of the display panel 100 is too low can be avoided. The backlight module 210 may be a cold cathode-ray tube, a light-emitting diode (LED) backlight source, or other structures. Furthermore, the display panel 100 includes a driving substrate 20, a light-filtering layer 30, and a color film substrate 40 which are stacked in sequence in stacked direction 001. As illustrated in FIG. 2, a liquid crystal layer 80 is further disposed between the driving substrate 20 and the light-filtering layer 30. Specifically, two opposite side surfaces between the driving substrate 20 and the light-filtering layer 30 define ditch-groove structures, and alignment films (which are not illustrated in FIG. 2) are attached to the ditch-groove structures, such that liquid crystal molecules in the liquid crystal layer 80 can be arranged neatly in the ditch-groove structures. A polarization state of lights emitted by the backlight module 210 can be changed by the liquid crystal layer 80, that is, the polarization state of the lights can be changed by an arrangement order and a deflection angle of the liquid crystal molecules in the liquid crystal layer 80. The driving substrate 20 is configured to control a signal voltage on a circuit in the display panel 100, and deliver the signal voltage to the liquid crystal molecules in the liquid crystal layer 80, thereby controlling the deflection angle of the liquid crystal molecules. In some implementations illustrated in FIG. 2, the light-filtering layer 30 is arranged on a side of the color film substrate 40 opposite to the backlight module 210. The lights emitted by the backlight module 210 pass through the liquid crystal layer 80 and then enters the light-filtering layer 30. The light-filtering layer 30 includes multiple light-filtering sub-pixels 32 of different colors, and the lights emitted to the light-filtering layer 30 can be converted into target colors by the multiple light-filtering sub-pixels 32. Lights of different colors are emitted outwards from the color film substrate 40, such that the display panel 100 displays a picture.

Furthermore, as illustrated in FIG. 2, the light-filtering layer 30 includes a black matrix 31 and multiple light-filtering sub-pixels 32. The black matrix 31 defines multiple second openings 311, and each of the multiple second openings 311 is filled with one light-filtering sub-pixel 32. As illustrated in FIG. 2, the light-filtering sub-pixel 32 is at least one of a red sub-pixel R, a green sub-pixel G, or a blue sub-pixel B. The light-filtering sub-pixel 32 is set to three primary colors of red, green, and blue, such that the display panel 100 can mix and match colors among the three primary colors to display different colors and brightnesses.

Figure 3:
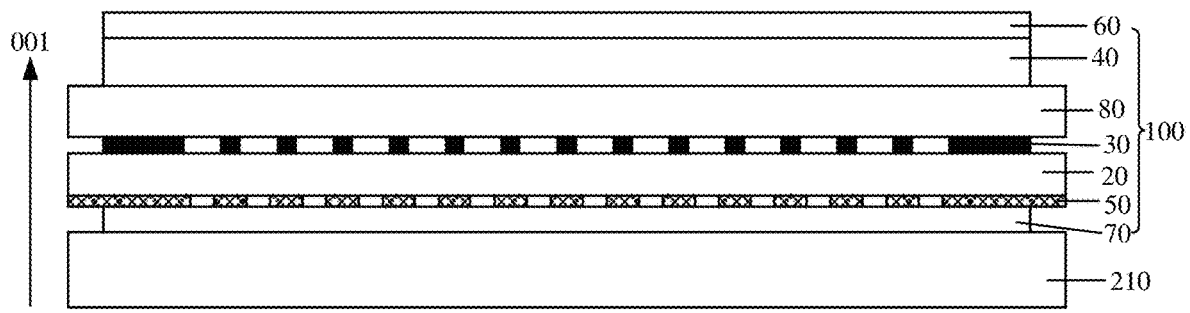
FIG. 3 is a schematic cross-sectional structural diagram of a display device in other implementations of the present disclosure.

Reference can be made to FIG. 3, which is a schematic cross-sectional structural diagram of a display device 200 in other implementations of the present disclosure. As illustrated in FIG. 3, the light-filtering layer 30 may also be disposed between the driving substrate 20 and the liquid crystal layer 80.

As illustrated in FIG. 3, the light-filtering sub-pixel 32 may be the red sub-pixel R, the green sub-pixel G, the blue sub-pixel B, or a light-filtering sub-pixel 32 of other colors. By mixing and matching among light-filtering sub-pixels 32 of various colors, colors and brightnesses that the display device 200 can display can be further enriched.

As illustrated in FIG. 3, the display panel 100 further includes an upper polarizing sheet 60 and a lower polarizing sheet 70. The upper polarizing sheet 60 is stacked at a light outlet side of the color film substrate 40, and the lower polarizing sheet 70 is stacked between the driving substrate 20 and the backlight module 210, that is, the lower polarizing sheet 70 is disposed at a light outlet side of the backlight module 210. As illustrated in FIG. 3, the upper polarizing sheet 60 and the lower polarizing sheet 70 are disposed in the display panel 100, such that the lights emitted by the backlight module 210 can pass through each layer structure of the display panel 100 unidirectionally, and a display effect and a display efficiency of the display panel 100 can be improved.

As illustrated in FIG. 3, the liquid crystal layer 80 may be connected with the driving substrate 20 or the color film substrate 40 directly, or other layer structures may be disposed between the liquid crystal layer 80 and the driving substrate 20 or between the liquid crystal layer 80 and the color film substrate 40, such as a transparent conductive indium-tin-oxide (ITO) layer for providing a conductive path. Specifically, as illustrated in FIG. 2, the liquid crystal layer 80 is disposed at a side of the driving substrate 20 away from the backlight module 210.

As illustrated in FIG. 3, the display panel 100 further includes a reflecting layer 50 between the driving substrate 20 and the backlight module 210. Specifically, the reflecting layer 50 is made of at least one of silver (Ag), chromium (Cr), magnesium (Mg), or aluminum (Al), or other metal materials with high reflectivity. Due to a high reflectivity of each of Ag, Cr, Mg, and Al, a demand for an overall reflectivity of the reflecting layer 50 can be met. Furthermore, as illustrated in FIG. 2, the reflecting layer 50 defines multiple first openings 51, and each of the multiple first openings 51 is aligned with one second opening 311. In other words, the each of the multiple first openings 51 of the reflecting layer 50 corresponds to the light-filtering sub-pixel 32 in the each of the multiple second openings 311 of the black matrix 31 in a one-to-one correspondence, and a physical part of the reflecting layer 50 corresponds to a physical part of the black matrix 31 in a one-to-one correspondence. The each of the multiple first openings 51 corresponds to the each of the multiple second openings 311, such that part of lights emitted from the backlight module 210 to the light-filtering sub-pixels 32 can be directly emitted from second openings 311 to the light-filtering sub-pixels 32 through first openings 51, and part of the lights emitted from the backlight module 210 to the black matrix 311 can be emitted from the first openings 51 to the second openings 311 after being reflected by the reflecting layer 50, and finally emitted outwards from the color film substrate 40. The reflecting layer 50 is disposed at the side of the driving substrate 20 opposite to the backlight module 210, and the reflecting layer 50 is directly attached to a side surface of the driving substrate 20 opposite to the backlight module 210. The reflecting layer 50 is disposed at the driving substrate 20, such that part of lights can be prevented from being reflected twice on the driving substrate 20 and then being emitted onto the color film substrate 40, thereby causing a halo at a periphery of an image bright region.

In other implementations, other film-layer structures can be disposed between the reflecting layer 50 and the driving substrate 20.

Figure 4:
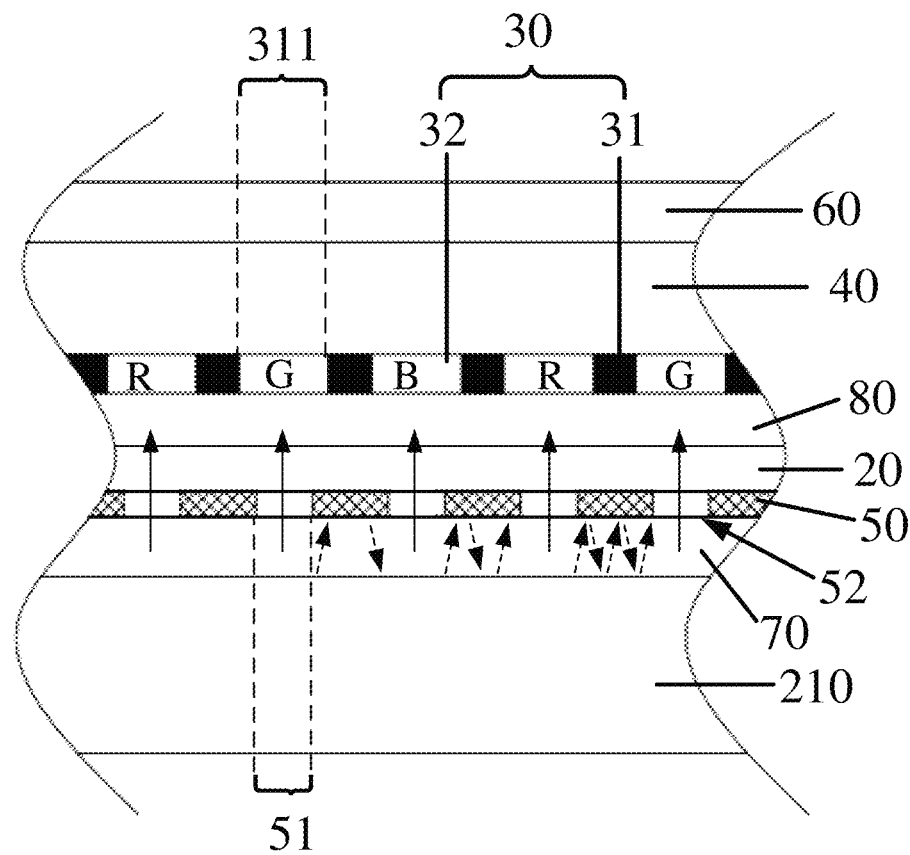
FIG. 4 is a partial enlarged schematic diagram of a cross-sectional structure of the display device in FIG. 2.

Reference can be made to FIG. 4, which is a partial enlarged schematic diagram of a cross-sectional structure of the display device 200 in FIG. 2. As illustrated in FIG. 4, part of the lights emitted from the backlight module 210 to the light-filtering sub-pixels 32 (as illustrated by solid arrows in FIG. 4) directly pass through the first openings 51 of the reflecting layer 50, are emitted from the second openings 311 of the black matrix 31 to the light-filtering sub-pixels 32, and then are emitted outwards from the color film substrate 40. Part of the lights emitted from the backlight module 210 to the black matrix 31 (as illustrated by dotted arrows in FIG. 4) are reflected by the reflecting layer 50, then emitted to a side of the backlight module 210 close to the color film substrate 40, and reflected again by the backlight module 210. In other words, part of the lights originally emitted to the black matrix 31 are reflected back and forth at least one time or multiple times between the reflecting layer 50 and the backlight module 210, such that propagation directions of the part of the lights emitted from the backlight module 210 to the black matrix 31 can be changed finally, and the part of the lights can be emitted outwards from the color film substrate 40 eventually. The propagation directions of part of the lights originally emitted to the black matrix 31 are changed by the reflecting layer 50, such that part of the lights are emitted outwards from the color film substrate 40, which reduces a light amount emitted by the backlight module 210 and absorbed by the black matrix 31, and increases a light outlet amount of the color film substrate 40, thereby improving a light utilization rate of the backlight module 210.

As illustrated in FIG. 4, the reflecting layer 50 further includes a reflecting surface 52, and the reflecting surface 52 is a flat surface of the reflecting layer 50 close to the backlight module 210. As illustrated in FIG. 4, the reflecting surface 52 of the reflecting layer 50 is a flat surface. The reflecting surface 52 of the reflecting layer 50 is fabricated as the flat surface, such that the reflecting layer 50 has a function of specular reflection, which can further improve a reflection efficiency of the reflecting layer 50 to lights.

Figure 5:
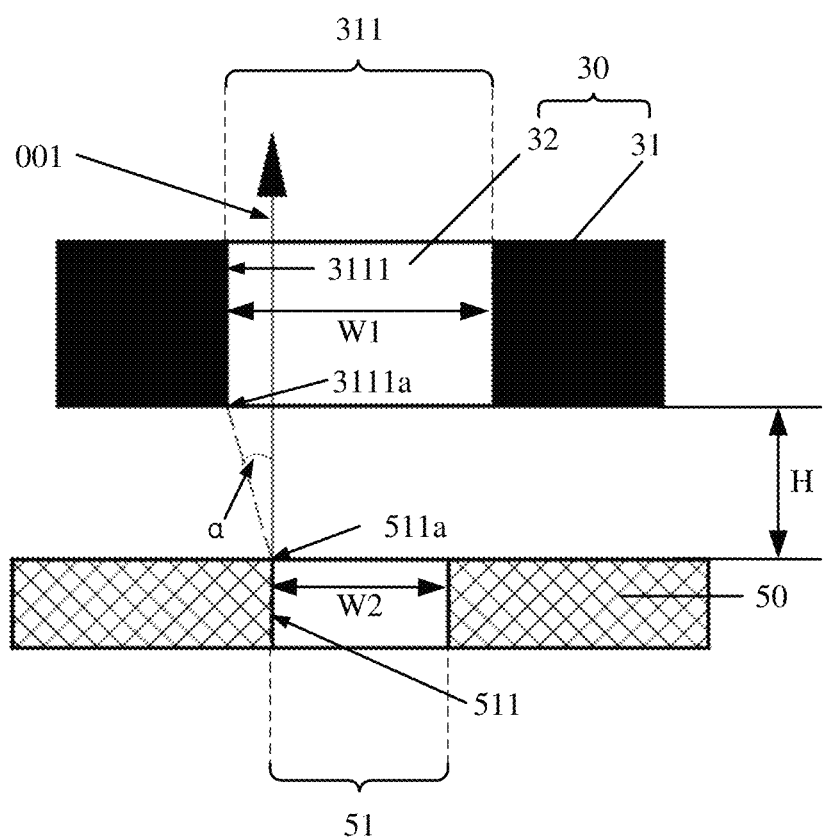
FIG. 5 is a schematic cross-sectional structural diagram between any first opening of a reflecting layer of a display device and a second opening aligned with the first opening in FIG. 2.

Reference can be made to FIG. 5, which is a schematic cross-sectional structural between any first opening 51 of a reflecting layer 50 and a second opening 311 aligned with the first opening 51 in FIG. 2. As illustrated in FIG. 5, a shape of the first opening 51 on the reflecting surface 52 is identical to a shape of the second opening 311 on a surface of the black matrix 31 close to the backlight module 210. Each of the first opening 51 and the second opening 311 may be rectangular, square, etc. As illustrated in FIG. 5, each of the first opening 51 and the second opening 311 is square.

In other implementations, the shape of the first opening 51 on the reflecting surface 52 and the shape of the second opening 311 on the surface of the black matrix 31 close to the backlight module 210 can also be adjusted differently according to needs of actual situations. For example, when the first opening 51 is square, the second opening 311 aligned with the first opening 51 may be rectangular.

Furthermore, as illustrated in FIG. 5, the first opening 51 of the reflecting layer 50 includes a first side wall 511, and the second opening 311 of the black matrix 31 includes a second side wall 3111 parallel to and close to the first side wall 511. The first side wall 511 includes a top edge 511a, and the top edge 511a is a side edge of the first side wall 511 close to the second opening 311 aligned with the first opening 51. The second side wall 3111 includes a bottom edge 3111a, and the bottom edge 3111a is a side edge of the second side wall 3111 close to the first opening 51 aligned with the second opening 311. Angle α between a plane determined by the top edge 511a and the bottom edge 3111a and stacked direction 001 may be less than 30 degrees.

In the present disclosure, angle α between the plane determined by the top edge 511a of the first side wall 511 of each of the multiple first openings 51 and the bottom edge 3111a of the second side wall 3111 of each of the multiple second openings 311 and stacked direction 001 is less than 30 degrees, such that an orthographic projection of the each of the first openings 51 on the driving substrate 20 completely covers an orthographic projection of the each of the multiple second openings 311 on the driving substrate 20, or the orthographic projection of the each of the multiple second openings 311 on the driving substrate 20 completely covers the orthographic projection of the each of the multiple first openings 51 on the driving substrate 20, or the orthographic projection of the each of the multiple first openings 51 on the driving substrate 20 just coincides with the orthographic projection of the each of the multiple second openings 311 on the driving substrate 20. Therefore, when brightness contrast of the display panel 100 is improved, an optimal viewing angle of the display panel 100 is ensured at the same time.

Specifically, as illustrated in FIG. 5, an edge length of the bottom edge 3111a of the second opening 311 is W1, and an edge length of the top edge 511a of the first opening 51 is W2. Edge length W1 of the bottom edge 3111a is usually determined according to an image resolution of the display panel 100, and can be adjusted differently according to different shapes of the second opening 311. Generally, edge length W1 of the bottom edge 3111a ranges from 5 μm to 200 μm. A distance between the first opening 51 and the second opening 311 in stacked direction 001 is H. It can be understood that distance H between the first opening 51 and the second opening 311 is the sum of thicknesses of layer structures disposed between the black matrix 31 and the reflecting layer 50, that is, the sum of thicknesses of the liquid crystal layer 80, the driving substrate 20, and circuit lines and thin-film-type insulating materials which are disposed at a side of the driving substrate 20 opposite to the backlight module 210. As illustrated in FIG. 2 and FIG. 5, a thickness of the driving substrate 20 ranges from 0.1 μm to 0.8 μm.

Figure 6:
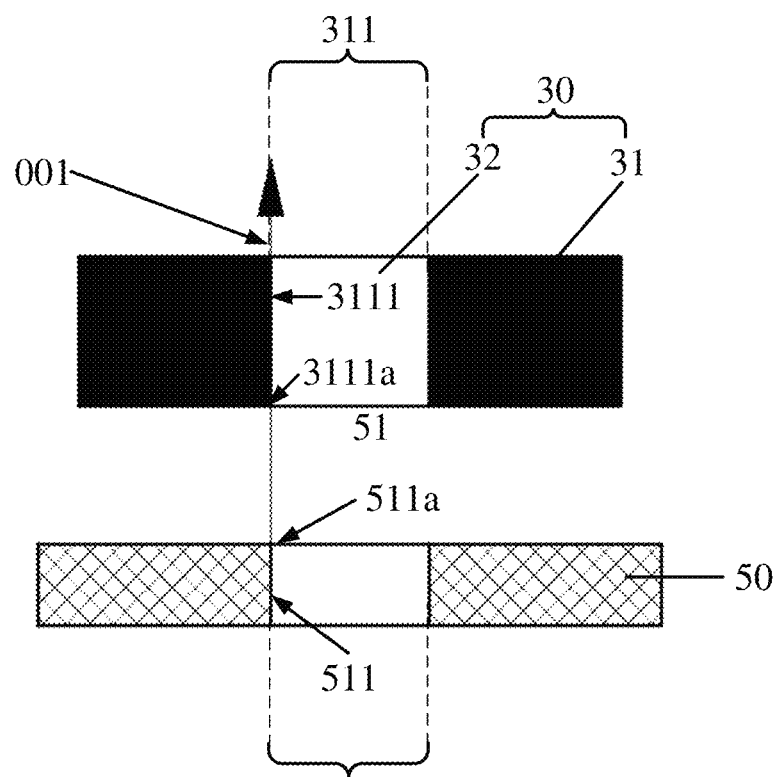
FIG. 6 is a schematic cross-sectional structural diagram between any first opening of a reflecting layer of a display device and a second opening aligned with the first opening in some implementations of the present disclosure.
Figure 7:
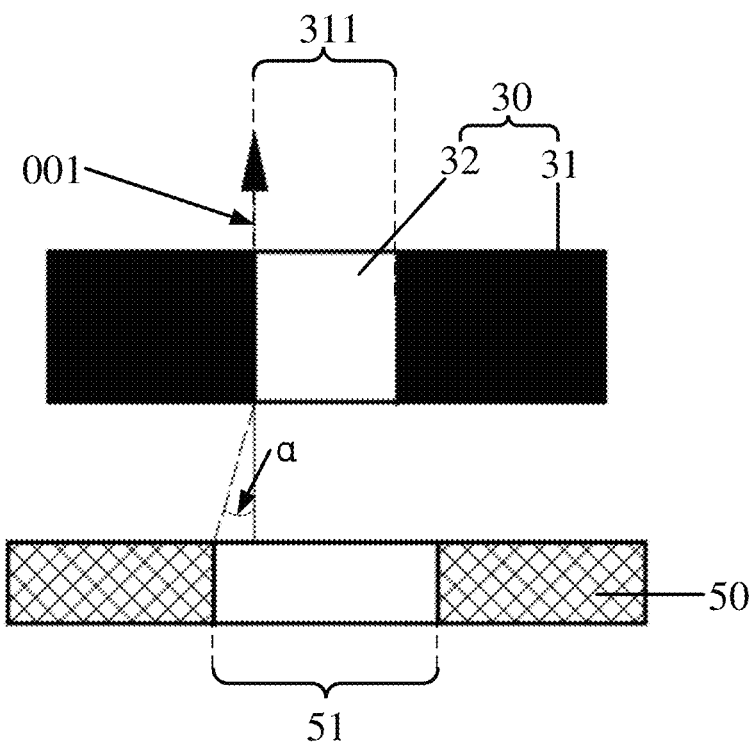
FIG. 7 is a schematic cross-sectional structural diagram between any first opening of a reflecting layer of a display device and a second opening aligned with the first opening in some implementations of the present disclosure.

Furthermore, a ratio of half of a difference between edge length W1 of the bottom edge 3111a and edge length W2 of the top edge 511a to distance H between the first opening 51 and the second opening 311 can be used to obtain a tangent value of angle α. In other words, as illustrated in FIG. 5 to FIG. 7, angle α between the plane determined by the top edge 511a of the first opening 51 and the bottom edge 3111a of the second opening 311 and stacked direction 001 is determined, such that a relative size relationship between an area of an orthographic projection of the first opening 51 on the driving substrate 20 and an area of an orthographic projection of the second opening 311 on the driving substrate 20 can be further determined. It should be noted that as illustrated in FIG. 5 to FIG. 7, when the orthographic projection of the second opening 311 on the driving substrate 20 completely covers the orthographic projection of the first opening 51 on the driving substrate 20, angle α is positive; and when the orthographic projection of the first opening 51 on the driving substrate 20 completely covers the orthographic projection of the second opening 311 on the driving substrate 20, angle α is negative. In other words, as illustrated in FIG. 5 to FIG. 7, positive and negative values of angle α are set only for distinguishing change directions of angle α in the present disclosure, but do not represent a numerical value of angle α in the mathematical meaning.

In some implementations illustrated in FIG. 5, angle α is positive. In other words, the area of the orthographic projection of the first opening 51 on the driving substrate 20 is smaller than the area of the orthographic projection of the second opening 311 on the driving substrate 20. In addition, when angle α is closer to +30 degrees, the area of the orthographic projection of the first opening 51 on the driving substrate 20 is smaller than the area of the orthographic projection of the second opening 311 on the driving substrate 20. In other words, the physical part of the reflecting layer 50 is larger than the physical part of the black matrix 31, such that when the reflecting layer 50 can reflect more lights, the light utilization rate of the backlight module 210 is higher. Therefore, an optimal viewing angle of the display panel 100 is narrower, and the light utilization rate of the backlight module 210 is higher.

Reference can be made to FIG. 6, which is a schematic cross-sectional structural diagram between any first opening 51 of a reflecting layer 50 and a second opening 311 aligned with the first opening 51 in some implementations of the present disclosure. As illustrated in FIG. 6, edge length W1 of the bottom edge 3111a is equal to edge length W2 of the top edge 511a, that is, angle α is 0 degree. It can be understood that when angle α is 0 degree, the area of the orthographic projection of the first opening 51 on the driving substrate 20 is equal to the area of the orthographic projection of the second opening 311 on the driving substrate 20.

As illustrated in FIG. 6, a geometric center of the first opening 51 of the reflecting layer 50 is aligned with a geometric center of the second opening 311 of the black matrix 31 in the stacked direction. In some implementations, the geometric center of the first opening 51 is aligned with the geometric center of the second opening 311, such that when the orthographic projection of the first opening 51 on the driving substrate 20 just coincides with the orthographic projection of the second opening 311 on the driving substrate 20, i.e., angle α is 0 degree, part of lights emitted to the black matrix 31 can be ensured to be completely reflected back to the backlight module 210 by the reflecting layer 50, which further makes part of the lights emitted from the first openings 51 to the light-filtering sub-pixels 32 in the second openings 311, and finally emitted outwards through the color film substrate 40.

Reference can be made to FIG. 7, which is a schematic cross-sectional structural diagram between any first opening 51 of a reflecting layer 50 and a second opening 311 aligned with the first opening 51, when angle α is −30 degrees. As illustrated in FIG. 7, when angle α is closer to −30 degrees, the area of the orthographic projection of the first opening 51 of the reflecting layer 50 on the driving substrate 20 is larger than the area of the orthographic projection of the second opening 311 of the black matrix 31 on the driving substrate 20, that is, an area of an orthographic projection of the physical part of the reflecting layer 50 on the driving substrate 20 is smaller than an area of an orthographic projection of the physical part of the black matrix 31, such that when the black matrix 31 absorbs more lights, the reflecting layer 50 reflects less lights, the light utilization rate of the backlight module 210 is reduced, and the optimal viewing angle of the display panel 100 is broadened.

A size and a direction of angle α between the plane determined by the top edge 511a of the first opening 51 and the bottom edge 3111a of the second opening 311 and stacked direction 001 are adjusted, such that the area of the orthographic projection of the first opening 51 on the driving substrate 20 and the area of the orthographic projection of the second opening 311 on the driving substrate 20 can be further adjusted. Therefore, brightness contrast and the optimal viewing angle of the display panel 100 can be adjusted as needed, and when brightness contrast of the display device 200 is improved, the optimal viewing angle of the display panel 100 can be ensured at the same time.

Figure 8:
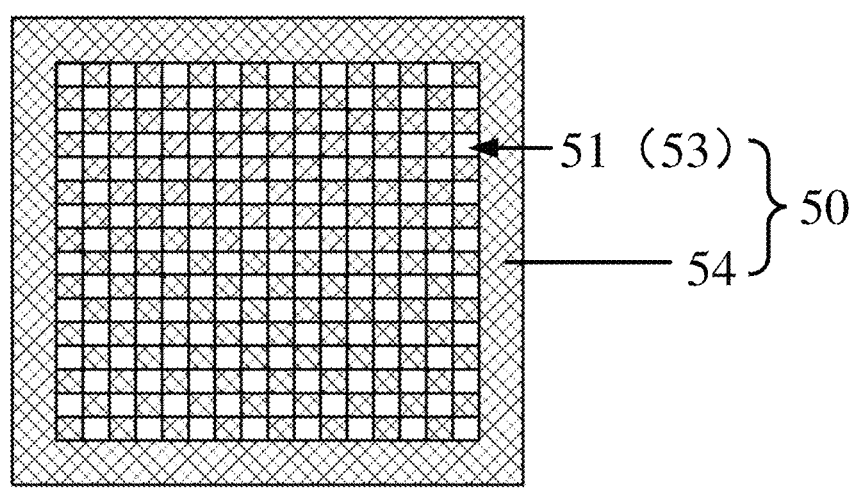
FIG. 8 is a schematic structural diagram of a reflecting layer of a display device from a side viewing angle in some implementations of the present disclosure.

Reference can be made to FIG. 8, which is a schematic structural diagram of a reflecting layer 50 from a side viewing angle in some implementations of the present disclosure. As illustrated in FIG. 8, the reflecting layer 50 includes a light-transmitting region 53 and a non-light-transmitting region 54. Specifically, as illustrated in FIG. 8, the multiple first openings 51 are defined within the light-transmitting region 53, such that part of lights of the backlight module 210 pass through the light-transmitting region 53 to be emitted to the light-filtering sub-pixels 32, and then emitted outwards from the color film substrate 40. The non-light-transmitting region 54 is disposed around a periphery of the light-transmitting region 53, such that part of the lights emitted from the backlight module 210 to the non-light-transmitting region 54 are all reflected back to the backlight module 210, and multiple back-and-forth reflections are performed between the backlight module 210 and the reflecting layer 50, and finally the part of the lights are emitted outwards from the color film substrate 40.

As illustrated in FIG. 8, the non-light-transmitting region 54 is disposed around the periphery of the light-transmitting region 53, such that the part of the lights emitted by the backlight module 210 can be prevented from being emitted outwards from a periphery of the display panel 100, which ensures that no light leak occurs at the periphery of the display panel 100. In the meanwhile, with aid of the non-light-transmitting region 54, additional light-shielding design is not needed, thereby simplifying a structure of the display device 200.

In other implementations, the non-light-transmitting region 54 is further provided with a sector region (not illustrated in FIG. 8) at a side of the non-light-transmitting region 54 opposite to the backlight module 210. A driving chip, and a scanning wire, a data transmission wire, and other conductive wires which are connected with the driving chip are integrated and disposed in the sector region. The sector region may be implemented as one sector region, two sector regions, three sector regions, or four sector regions.

Figure 9:
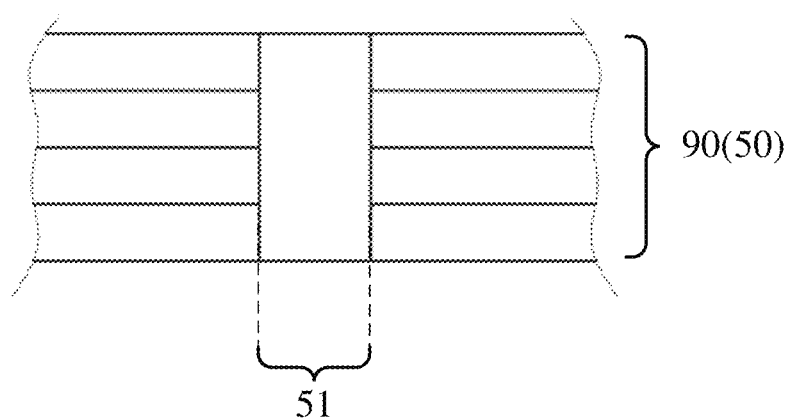
FIG. 9 is a schematic cross-sectional structural diagram of a reflecting layer of a display device in some implementations of the present disclosure.

Reference can be made to FIG. 9, which is a schematic cross-sectional structural diagram of a reflecting layer 50 in some implementations of the present disclosure. As illustrated in FIG. 9, the reflecting layer 50 further includes multiple film layers 90, the multiple film layers 90 are stacked in sequence in stacked direction 001, and a refractive-index difference between any adjacent film layers 90 is greater than or equal to 0.3. In addition, as illustrated in FIG. 9, a refractive index of the multiple film layers 90 ranges from 1.1 to 2.3, and a refractive-index difference between any two adjacent film layers 90 ranges from 0.24 to 0.4. In other words, the reflecting layer 50 is disposed to have a structure of the multiple film layers 90 and the refractive-index difference between any two adjacent film layers 90 is made to range from 0.25 to 0.4, such that a reflectivity of a light on a contact surface between two adjacent film layers 90 can be improved, thereby improving an overall reflectivity of the reflecting layer 50.

It can be understood that the above scenarios are only for examples, and do not constitute a limitation to the application scenarios of the technical solutions provided in implementations of the present disclosure, and the technical solutions of the present disclosure can also be applicable to other scenarios. For example, those of ordinary skill in the art will see that the technical solutions provided in implementations of the present disclosure are equally applicable to similar technical problems.

The serial numbers of the implementations of the present disclosure are merely for description and do not represent advantages and disadvantages of implementations.

The implementations of the present disclosure can be merged, divided, and deleted according to actual needs.

In the present disclosure, the same or similar terminological concepts, technical solutions, and/or application scenario descriptions are generally described in detail only when they appear for the first time. When they reappear later, they are generally not repeated for the sake of simplicity. When understanding the technical solutions and other contents of the present disclosure, reference can be made to the previous related detailed descriptions of the same or similar terminological concepts, technical solutions, and/or application scenario descriptions that are not described in detail later.

In the present disclosure, the description of each implementation has its own emphasis. For the part not elaborated or recorded in one implementation, reference can be made to related descriptions of other implementations.

Technical features of technical solutions of the present disclosure can be combined arbitrarily. For the sake of concise description, all possible combinations of the technical features in the above implementations have not been described. However, as long as no contradiction exists among the combinations of the technical features, the combinations of the technical features should be considered as the scope of the present disclosure.

The above implementations are only the exemplary implementations of the present disclosure, and thus do not limit the scope of the present disclosure. Equivalent structure or equivalent process transformation made by the specification and the accompanying drawings of the present disclosure, or directly or indirectly applied to other related technical fields, should be included in the scope of patent protection of the present disclosure similarly.

What is claimed is:

1. A display panel, comprising:
    a light-filtering layer;
    a color film substrate;
    a driving substrate;
    a reflecting layer; and
    a lower polarizing sheet, wherein,
    the reflecting layer, the driving substrate, the light-filtering layer, and the color film substrate are stacked in sequence, and the reflecting layer is located at a side close to a light source;
    the light-filtering layer comprises a black matrix with a plurality of second openings, each of the plurality of second openings is filled with one light-filtering sub-pixel, the reflecting layer defines a plurality of first openings, and each of the plurality of first openings is aligned with one second opening;
    the reflecting layer comprises a plurality of film layers stacked in a stacked direction from the driving substrate to the light-filtering layer, and a refractive-index difference between any adjacent film layers is greater than or equal to 0.3; and
    the lower polarizing sheet is stacked at a side of the driving substrate away from the color film substrate, and the reflecting layer is stacked between the driving substrate and the lower polarizing sheet.

2. The display panel of claim 1, wherein the each of the plurality of first openings and each of the plurality of second openings which are aligned with each other have identical shapes, the each of the plurality of first openings comprises a first side wall, the each of the plurality of second openings comprises a second side wall parallel to and close to the first side wall, and an angle between a plane determined by a top edge of the first side wall and a bottom edge of the second side wall and the stacked direction is less than 30 degrees.

3. The display panel of claim 2, wherein a geometric center of the each of the plurality of first openings is aligned with a geometric center of the each of the plurality of second openings in the stacked direction.

4. The display panel of claim 1, wherein the reflecting layer comprises a light-transmitting region and a non-light-transmitting region, the plurality of first openings are defined within the light-transmitting region, and the non-light-transmitting region is disposed around a periphery of the light-transmitting region.

5. The display panel of claim 1, wherein the reflecting layer is made of at least one of silver (Ag), chromium (Cr), magnesium (Mg), or aluminum (Al).

6. The display panel of claim 1, wherein the light-filtering layer is located on the color film substrate or the driving substrate.

7. The display panel of claim 6, further comprising:
    an upper polarizing sheet stacked at a side of the color film substrate away from the driving substrate.

8. The display panel of claim 6, wherein the light-filtering sub-pixel comprises at least one of a red sub-pixel, a green sub-pixel, or a blue sub-pixel.

9. The display panel of claim 6, further comprising:
    a liquid crystal layer located between the driving substrate and the color film substrate.

10. A display device, comprising:
    a backlight module; and
    a display panel comprising:
        a light-filtering layer;
        a color film substrate;
        a driving substrate;
        a reflecting layer; and
        a lower polarizing sheet, wherein,
    the reflecting layer, the driving substrate, the light-filtering layer, and the color film substrate are stacked in sequence, and the reflecting layer is located at a side close to a light source;
    the light-filtering layer comprises a black matrix with a plurality of second openings, each of the plurality of second openings is filled with one light-filtering sub-pixel, the reflecting layer defines a plurality of first openings, and each of the plurality of first openings is aligned with one second opening, wherein the backlight module serves as the light source and is configured to provide lights for the display panel;
    the reflecting layer comprises a plurality of film layers stacked in a stacked direction from the driving substrate to the light-filtering layer, and a refractive-index difference between any adjacent film layers is greater than or equal to 0.3; and
    the lower polarizing sheet is stacked at a side of the driving substrate away from the color film substrate, and the reflecting layer is stacked between the driving substrate and the lower polarizing sheet.

11. The display device of claim 10, wherein the each of the plurality of first openings and each of the plurality of second openings which are aligned with each other have identical shapes, the each of the plurality of first openings comprises a first side wall, the each of the plurality of second openings comprises a second side wall parallel to and close to the first side wall, and an angle between a plane determined by a top edge of the first side wall and a bottom edge of the second side wall and the stacked direction is less than 30 degrees.

12. The display device of claim 11, wherein a geometric center of the each of the plurality of first openings is aligned with a geometric center of the each of the plurality of second openings in the stacked direction.

13. The display device of claim 10, wherein the reflecting layer comprises a light-transmitting region and a non-light-transmitting region, the plurality of first openings are defined within the light-transmitting region, and the non-light-transmitting region is disposed around a periphery of the light-transmitting region.

14. The display device of claim 10, wherein the reflecting layer is made of at least one of silver (Ag), chromium (Cr), magnesium (Mg), or aluminum (Al).

15. The display device of claim 10, wherein the light-filtering layer is located on the color film substrate or the driving substrate.

16. The display device of claim 15, wherein the display panel further comprises:
    an upper polarizing sheet stacked at a side of the color film substrate away from the driving substrate.

17. The display device of claim 15, wherein the light-filtering sub-pixel comprises at least one of a red sub-pixel, a green sub-pixel, or a blue sub-pixel.

18. The display device of claim 15, wherein the display panel further comprises:

a liquid crystal layer located between the driving substrate and the color film substrate.

* * * * *